United States Patent [19]
Beige et al.

[11] Patent Number: 5,747,144
[45] Date of Patent: May 5, 1998

[54] COSTUMES WITH SEMI-RIGID FABRIC COMPONENTS AND METHOD OF MANUFACTURE OF SAME

[75] Inventors: Marc P. Beige, North Hills; John G. Kearns, Woodhaven, both of N.Y.

[73] Assignee: Rubie's Costume Co., Inc., Richmond Hill, N.Y.

[21] Appl. No.: 626,970

[22] Filed: Apr. 3, 1996

[51] Int. Cl.⁶ ............................................. B32B 1/00
[52] U.S. Cl. ..................... 428/187; 428/102; 428/175; 264/571; 264/257; 264/DIG. 78; D2/741; D21/189; D21/190
[58] Field of Search ............................ D2/741; D21/189, D21/190; 428/102, 175, 187; 264/571, 257, DIG. 78

[56] References Cited

U.S. PATENT DOCUMENTS 4,104,430  8/1978  Fenton ............................. 428/175
4,878,972  11/1989  Kaneko et al. ....................... 156/78

*Primary Examiner*—Christopher Raimund
*Attorney, Agent, or Firm*—Levisohn, Lerner, Berger & Langsam

[57] ABSTRACT

A process for manufacturing a costume having semi-rigid costume components, and the costume itself. The semi-rigid costume components are capable of being sewn to fabric to form an integrated costume. An embodiment is shown in which the costume includes a semi-rigid muscular torso suitable for a superhero chestpiece. The sewn rigid component is formed from fusing a layer of fabric to a layer of foam and the resulting laminate is vacuum molded into a three-dimensional shape.

21 Claims, 3 Drawing Sheets

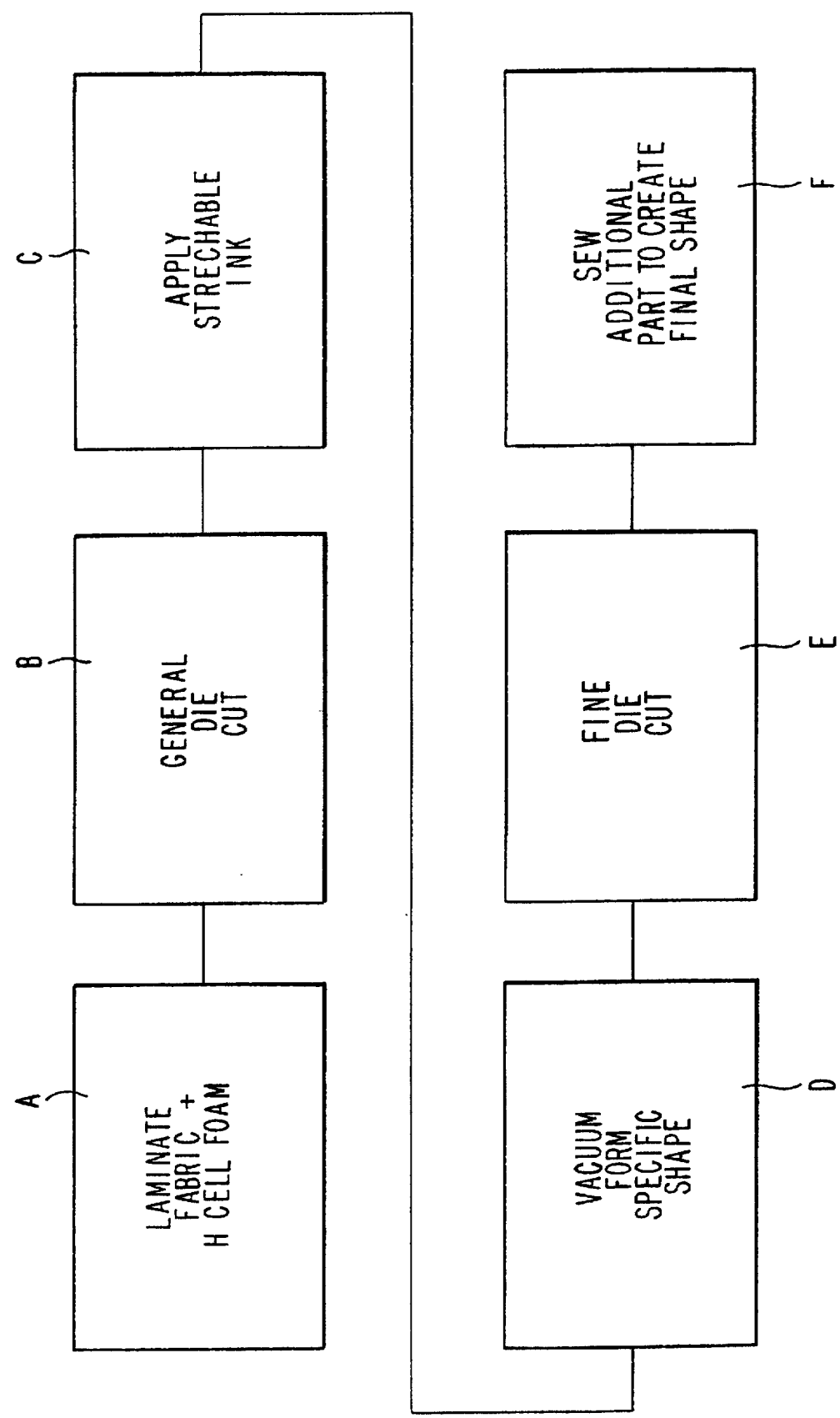

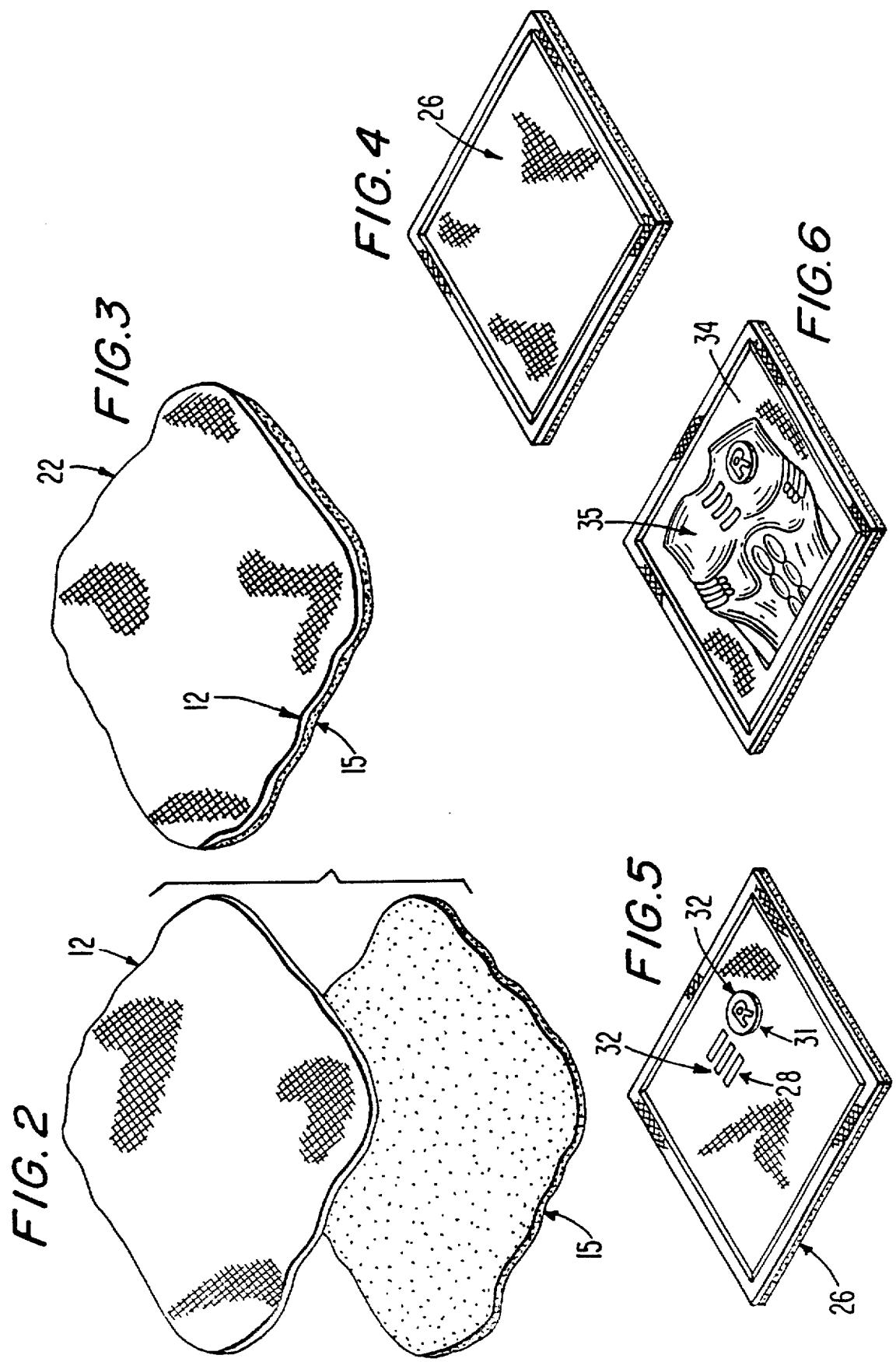

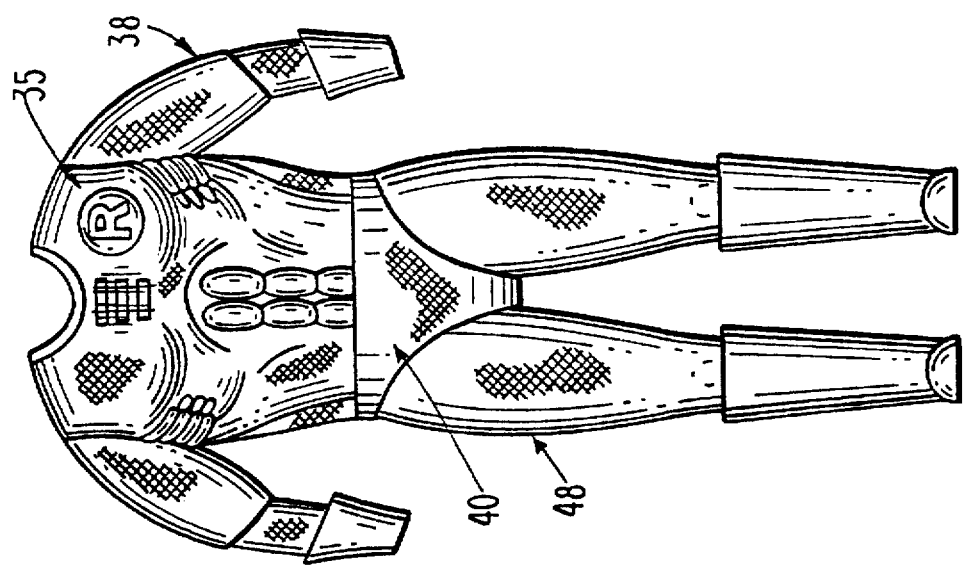
FIG. 9
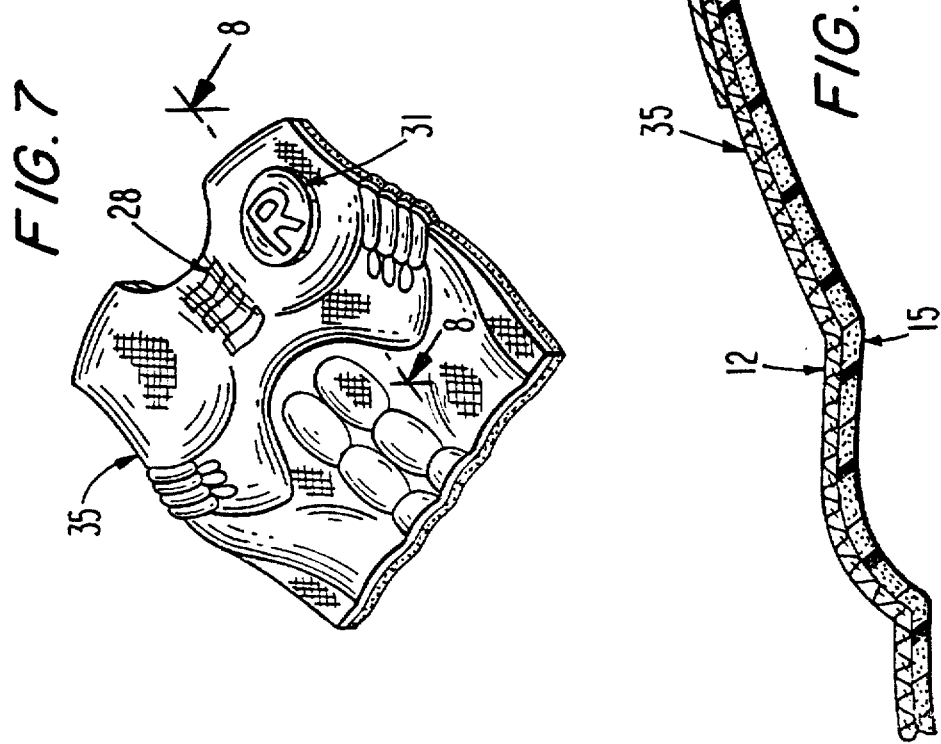
FIG. 7
FIG. 8

COSTUMES WITH SEMI-RIGID FABRIC COMPONENTS AND METHOD OF MANUFACTURE OF SAME

FIELD OF THE INVENTION

The present invention relates to a method for manufacturing a costume and to the costume thereby manufactured. More specifically, the present invention relates to a method for the manufacture of costumes having semi-rigid or rigid fabric components, and to the manufactured costume itself having a semi-rigid or rigid costume component sewn to other fabric components to form a complete costume. In the preferred embodiment, the semi-rigid costume component provides a small child with a costume having an upper torso area which appears, three dimensionally, to be extremely well-developed. This enables the child to more realistically masquerade as a superhero.

BACKGROUND OF THE INVENTION

Many holidays, occasions and parties are celebrated throughout the world in which costumes play a significant and important role. In the United States, Halloween is perhaps the most notable example. Each year, on the 31st of October, children dress up as their favorite action heros, as famous historical figures, and as storybook characters.

Similarly, in other countries and cultures, numerous other costume-oriented holidays are equally significant. In Brazil, for example, the celebration of Mardi Gras is accompanied by lavish decorative costumes worn by young and old alike. In China, the Chinese New Year is a popular event, featuring brightly colored costumes. Likewise, in Israel and other Jewish communities, the Jewish holiday of Purim is a festive celebration in which many wear costumes as part of the festivities of the holiday.

Even during other times of the year, costumes are significant. Many adults hold costume/masquerade parties from time to time, to which they invite friends, relatives and acquaintances. They attend dressed in costumes. Consequently, costumes are a popular form of clothing around the world. Wearing a distinct and unusual costume, allowing the wearer to more accurately masquerade or portray the character of the costume, is very important. Thus, a non-muscled or physically unfit individual or small child, if provided with a realistic three dimensional upper torso, apparently muscle toned, is highly regarded and desirably sought.

Many different types of costumes exist, and are prevalent in the art. Some of these costumes are made of cloth. Other costumes are currently made of plastic, or other similar synthetic materials. Plastic component costumes have the advantage that they can be made from molded elements. However, it has traditionally been difficult to integrate plastic portions into a cloth or fabric costume using traditional sewing techniques, since the plastic component is too hard to be penetrated by the needle and if penetrated, the plastic, necessarily thinly manufactured, often rips. On the other hand, the fabric of cloth costumes, while easy to sew, is too flexible and supple for certain three-dimensional effects, types of costume, or applications. Fabric with printing thereon, intended to provide the viewer with a three-dimensional appearance, is not always realistic.

Accordingly, there is a need in the art for a costume primarily made of cloth, having rigid or semi-rigid fabric body elements to simulate three dimensional costume components. There is also a need in the art for a method of manufacturing a costume which is easy, inexpensive, and allows rigid fabric-based body elements to be sewn together with traditional cloth to form a novel costume and effect. There is also a need in the art for an improved and attractive costume having a semi-rigid fabric construction as one of its costume components. This provides a realistic three-dimensional appearance for a costume, a very desirable feature for masquerading.

SUMMARY OF THE INVENTION

An object of the present invention is to provide a costume with a rigid or semi-rigid component.

A further object of the present invention is to provide a costume with semi-rigid fabric components that can be attached by sewing to ordinary fabric or cloth.

A further object of the present invention is to provide a costume with a molded fabric component.

A further object of the present invention is to provide a cloth or fabric costume with fabric-covered body components that retain a rigid, semi-rigid or three-dimensional shape.

A further object of the present invention is to provide a cloth or fabric-covered costume which has enlarged, semi-rigid or three-dimensional muscle-like features.

A further object of the present invention is to provide a cloth or fabric-covered costume having a semi-rigid fabric-covered torso portion of well-developed three-dimensional muscular shape.

A further object of the present invention is to provide a method for manufacturing a fabric-based costume with a fabric-covered rigid or semi-rigid shape incorporated therein.

A further object of the present invention is to provide a method for manufacturing a costume in which rigid or semi-rigid fabric components can be attached, by sewing, to ordinary fabric or cloth.

A further object of the present invention is to provide a method for manufacturing a costume out of fabric, which has portions having a semi-rigid, three-dimensional, muscle-like appearance.

BRIEF DESCRIPTION OF THE DRAWINGS

FIG. 1 shows a flow chart of the process for the manufacture of a costume in accordance with the present invention with rigid or semi-rigid fabric components being incorporated into the costume.

FIG. 2 is a front, bottom and right perspective view of a sheet of fabric and a sheet of H-Cell foam material, prior to being fused together in accordance with the present invention.

FIG. 3 is a front, bottom and right perspective view of the fabric and H-Cell foam materials of FIG. 2 after fusing of the H-Cell foam material with the fabric, to form a single sheet of laminated material, in accordance with the present invention.

FIG. 4 is a front, bottom and right perspective view of the sheet of laminated material of FIG. 3, after a general die cut, in accordance with the present invention.

FIG. 5 is a front, bottom and right perspective view of the die cut material of FIG. 4, after application by printing or silk screening of stretchable ink, in accordance with the present invention.

FIG. 6 is a front, bottom and right perspective view of the inked laminated material of FIG. 5, after vacuum molding to form a specific three-dimensional shape. The shape shown in the embodiment illustrated in the Figure is a muscular upper torso.

3

FIG. 7 is a front, bottom and right perspective view of the vacuum molded costume component of FIG. 6 after a fine die cut, to form the finished upper torso, prior to sewing it into a finished costume.

FIG. 8 is a cross section of the vacuum molded costume component of FIG. 7, taken along lines 8—8 of FIG. 7; and, FIG. 9 is a front view of a costume, in accordance with the present invention, having the three-dimensional muscular upper torso costume component of FIG. 7 sewn to arms, pelvis, and legs of fabric to form a complete costume.

DETAILED DESCRIPTION OF THE PREFERRED EMBODIMENT AND THE DRAWINGS

As shown in FIG. 1, a flow chart is provided of the various steps used in the manufacture of a costume, in accordance with the present invention. Reference may be made to the flow chart in conjunction with the description of the other figures showing the preferred embodiment of the finished costume, in its various stages of manufacture. Although the figures demonstrate the use of the present invention to make a muscular looking superhero chestpiece, it will be appreciated that the present invention can be used to make any desired semi-rigid shape or three dimensional, fabric-covered component for a costume, and is not limited to the embodiment disclosed. The semi-rigid costume components created in accordance with the present invention can be sewn into any portion of a costume, and is not limited to the chestpiece shown.

As shown in FIG. 2, a sheet of fabric 12 is depicted, in conjunction with a sheet of H-Cell foam material 15. The fabric can be, for example, a sheet of polyester. Other garment fabric materials can be used, as well. The H Cell foam material 15 is an open cell foam material. In the preferred embodiment, it is about 5/16" in thickness. The sheet of fabric 12 is placed on top of H-Cell foam sheet 15 and then, the composite is subjected to heat and pressure. Two layers are fused together, and the process is shown schematically in Block A of FIG. 1. The fusing laminates the fabric to the foam to form a dual layer of laminated material 22, as shown in FIG. 3.

Following lamination of the fabric 12 and the H-Cell foam material 15 to form the dual layer of laminated material 22, the laminated material 22 is subjected to a gross or general die cut which results in the material having square edges, facilitating printing thereon. The general die cut step is shown schematically in FIG. 1, as Block B. This results in rectangles or squares 26, as shown in FIG. 4. Each of these rectangles or squares 26 can be used to form a separate costume component or several components can be made from a square 26, if each is suitably dimensioned.

As shown in FIG. 5 (corresponding to Block C in FIG. 1), following a general die cut of the laminated material 22, stretchable ink 32 is printed or applied in a desired artistic manner to square 26. In the figure, the stretchable ink 32 is applied to show three bars 28 and a circle 31 having the letter "R". The combination of shapes to be printed is for illustration purposes, and can be used for example, to make a superhero chestpiece for a costume of the superhero "Robin®" as the character appears in the famous "Batman® and Robin®" adventures of Warner Communications Corp. Any other desired shapes, letters, accent lines, etc., can likewise be utilized and printed on the laminated sheet, in accordance with the needs of the specific costume to be made.

Application of the stretchable ink is a process which must take the three-dimensional characteristics of the final desired costume component into account. During the initial application of the stretchable ink 32, the laminated material 22 is a flat surface. As it is intended that the laminated material 22 be molded into a three-dimensional component, however, from a flat sheet, the stretchable ink will often be printed on or applied initially in a distorted shape on the flat sheet or surface. It is intended, however, that the printing, when vacuum formed into its ultimate three-dimensional shape will have the desired straight lines and/or curves and present a clean exact look without gaps or spaces in the designs.

For example, in the embodiment shown, it is desired to have bars representing laces and a circle with an "R" within it on the final costume component. As a result, the initial stretchable ink will be applied to the costume in a shape which takes into account the curvature expected after molding of the laminated material 22. Consequently, when initially applied, the stretchable ink may appear distorted, as that ink is intended to be stretched by vacuum molding into the desired three-dimensional shape on the final costume component. Thus, when the laminated surface 22 is later molded, and changed from a two-dimensional surface to a three-dimensional configuration, the stretchable ink shape will be transformed from the distorted shape into the final shape desired. The exact shape required for the printing, so as to create the desired shape after stretching, may be determined by trial and error, or by computer modelling. Although stretchable ink is not necessary for practice of the present invention, since a costume component can be fabricated having an interesting shape alone, with no printing upon it, in many costume designs the use of the stretchable ink printed onto the fabric, to further adorn the costume, is preferred.

Following application of the stretchable ink 32 to the laminated material 22, the laminated and now printed on material is vacuum formed or molded into a costume component 35 in the specific shape desired. This is schematically indicated in Block D of FIG. 1. This is also shown in FIG. 6. The combination of the lamination of fabric to H-celled foam, previously described, and the vacuum molding step creates and results in a semi-rigid, three-dimensional fabric-covered section of material in the desired shape. Yet, even though this material is semi-rigid, it is still easily sewn to other fabric components. This is because the fabric top layer of the laminate can be sewn to other fabric-only pieces, in a conventional sewing technique. In the embodiment shown in FIG. 6, the material is vacuum molded into a chestpiece component which provides the appearance of the upper torso of a superhero costume. The chestpiece is ridged and shaped to appear like a very muscular and well-tuned torso. Due to the vacuum molding rigidity created by the process described herein, the component retains its distinctive rippled shape. This shape endures even after the component is removed from the molding apparatus.

Following vacuum molding or forming of the costume component 35, a fine die cut is then performed on the shaped sheet of laminated material to remove the extraneous material or selvage from around the costume component 35. This fine die cut removes the vacuum formed shape from the general die cut sheet 34, and leaves a semi-rigid costume component 35 suitable for sewing into a complete costume, as shown in FIG. 9. A cross section of the three-dimensionally configured, semi-rigid costume component is shown in FIG. 8. Block E of FIG. 1 schematically represents the fine die cut step.

The costume component 35 can then be easily sewn together with other fabric sections to form a full costume, as shown in FIG. 9. Costume component 35, a muscular upper torso, is sewn to arms 38 and to pelvis 40 (which is itself attached to legs 48) to form a superhero costume, as shown. While the fabric sections 38, 40 and 48 are supple and flexible, the torso area created by the present invention maintains a shell-like semi-rigidity. This lends an attractive and unusual effect to the costume, and creates a novel form of costume which is not present in the prior art. Moreover, the process is easy and inexpensive, and efficiently produces a desirable effect. The final assembly of the costume component 35 with the fabric sections 38, 40 and 48 is schematically represented by Block F in FIG. 1.

FIG. 8 is a cross sectional view of a portion of the vacuum formed chestpiece 35. Circle 31 is shown on top of the chest and is not to scale but shown of a greater relative thickness for clarity of illustration.

Consequently, the present invention can be used to make numerous different costume types and designs. As shown in the embodiment illustrated in the Figures, it can be used to form a Robin® superhero type costume, in which the upper torso is a muscular semi-rigid type shell. In this embodiment, the rib cage, abdominal and pectoral muscles are clearly prominent. Any other costume component can be constructed using the present invention, and that costume component can either be worn as it is, or be sewn together with sections of fabric. As a result, a highly distinctive effect is produced.

Having described this invention with regard to specific embodiments, it is to be understood that the description is not meant as a limitation since further variations or modifications may be apparent or may suggest themselves to those skilled in the art. It is intended that the present application cover such variations and modifications as fall within the scope of the appended claims.

What is claimed is:

1. A method for manufacturing a component for a costume, comprising the steps of:
    (a) providing a sheet of fabric and a separate foam sheet;
    (b) fusing said sheet of fabric to said foam sheet to form a fused, laminated sheet; and,
    (c) vacuum molding said laminated sheet to form the three-dimensional shape of a human upper torso.

2. A method for manufacturing as claimed in claim 1, further comprising the step of applying stretchable ink to said laminated sheet.

3. A method for manufacturing as claimed in claim 2, wherein said stretchable ink is applied to said laminated sheet before said step of vacuum molding.

4. A method for manufacturing as claimed in claim 1, further comprising the step of gross die cutting a first section of said laminated material, and before said step of vacuum molding.

5. A method for manufacturing as claimed in claim 4, further comprising the step of performing a fine die cut on said vacuum molded, laminated sheet.

6. A method for manufacturing as claimed in claim 5, further comprising the step of sewing said component for a costume to fabric pieces to form a complete costume.

7. A method as claimed in claim 2 wherein said step of applying stretchable ink accommodates the differences in surface configuration of said laminated sheet before and after said step of vacuum molding, to present an integrated visual effect after said step of vacuum molding.

8. A method for manufacturing as claimed in claim 1 further comprising the step of sewing said component to fabric pieces to form a unitard-style costume.

9. A three-dimensional costume component representing the pectoral and/or abdominal muscles of a well-toned human comprising:
    a) a fabric layer; and
    b) a foam layer; said fabric and foam layers being fused to form a laminated sheet which is vacuum molded.

10. A three-dimensional costume component as claimed in claim 9 further comprising a stretchable ink design printed on said fabric layer.

11. A three-dimensional costume component as claimed in claim 9 wherein said costume component is in the shape of an upper torso.

12. A three-dimensional costume component as claimed in claim 9 wherein said costume component is integrated into a unitard.

13. A three-dimensional costume component as claimed in claim 9 wherein said costume component is sewn to additional fabric to form an integrated costume.

14. A costume comprising:
    a costume component, said costume component comprising a first layer of fabric and a second layer of foam fused to said fabric to form a laminated sheet, said laminated sheet being vacuum molded into a three-dimensional desired shape in the shape of an upper torso.

15. A costume as claimed in claim 14, wherein said first layer of fabric comprises polyester.

16. A costume as claimed in claim 14, in which said costume component further has stretchable ink applied to said fabric of said laminated sheet.

17. A costume as claimed in claim 14, in which said costume component is sewn to fabric pieces to form a unitard.

18. A costume as claimed in claim 14, in which said costume component comprises a chestpiece sewn to fabric, said chestpiece having stretchable ink on its surface.

19. A costume, said costume comprising a semi-rigid and three-dimensional upper-torso component, said upper torso component comprising a layer of fabric, heat laminated and fused to a layer of foam, said upper-torso component being vacuum formed into a three-dimensional shape of a well-toned human and sewn to other fabric components.

20. A costume as claimed in claim 19, in which said other fabric components together with said upper torso component form a unitard.

21. A costume as claimed in claim 19, in which said semi-rigid component has stretchable ink applied on its surface.

* * * * *